Figure 1:
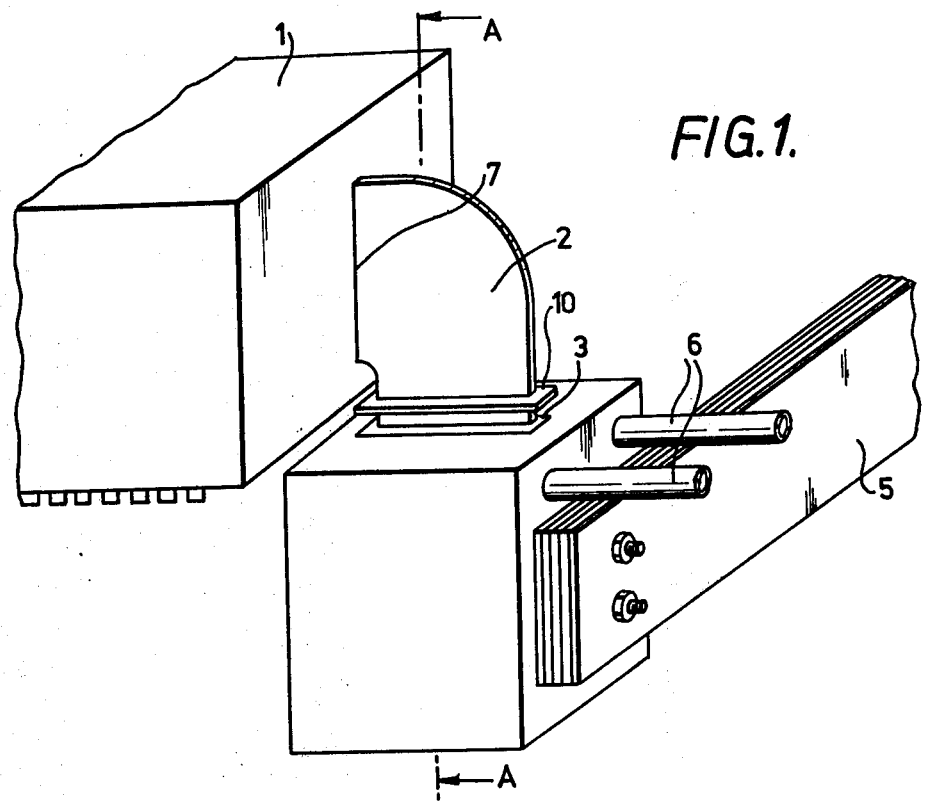

United States Patent [19]

Knapton et al.

[11] 4,004,844
[45] Jan. 25, 1977

[54] ELECTRICAL CONNECTOR

[75] Inventors: Arthur George Knapton; Gordon Leslie Selman; Stephen Lionel Pearce, all of London, England

[73] Assignee: Johnson Matthey & Co., Limited, London, England

[22] Filed: Sept. 19, 1975

[21] Appl. No.: 615,089

[30] Foreign Application Priority Data

Sept. 25, 1974 United Kingdom ............ 41687/74

[52] U.S. Cl. ................................. 339/118 R; 13/6
[51] Int. Cl.² .......................................... H01R 3/04
[58] Field of Search ........... 339/118 R, 117 R; 13/6

[56] References Cited

UNITED STATES PATENTS

| | | | |
|---|---|---|---|
| 2,277,679 | 3/1942 | Borel | 13/6 |
| 2,531,612 | 11/1950 | Crochet et al. | 13/6 X |
| 2,928,887 | 3/1960 | Eden | 13/6 |

*Primary Examiner*—Roy Lake
*Assistant Examiner*—DeWalden W. Jones
*Attorney, Agent, or Firm*—Cushman, Darby & Cushman

[57] ABSTRACT

This invention relates to an electrical connection for use in connection with an apparatus including a container suitable for holding molten glass at a high temperature and electrically connected through the connection to a source of electric current. Typically, the connection comprises a reservoir of electrically conducting material which is liquid at temperatures of operation and a current carrying conductor electrically connected to the said container and mounted for continuous electrical contact with the electrically conducting liquid during movement of the said container.

14 Claims, 2 Drawing Figures

ELECTRICAL CONNECTOR

This invention relates to an electrical connection for the passage of electric current; more particularly it relates to an electrical connection for use with apparatus and equipment which undergoes substantial thermal expansion and contraction.

In the glass industry, heating of containers designed for the processing of molten glass is often achieved by the passage of an electric current directly through the metal of the container. Large current of the order of thousands of amperes are required in such applications and have to be carried from the power supply by substantial cables and busbars. One of the most important of these direct heating applications is in the manufacture of continuous glass fibres. These are drawn from numerous nozzles usually in the base of a rectangular through called a bushing. Owing to the high temperatures and oxidizing conditions involved in the operation, the only satisfactory material for bushing manufacture is platinum or some alloy based on platinum. The heating current for such a bushing is normally supplied via rectangular cross-section conductors or lugs, also of platinum or platinum alloy, welded to the ends of the trough. Electrical contact is made to these lugs by means of bulky copper clamps, usually cooled, which are in turn bolted in good electrical contact to the current carrying cables and busbars. The clamps apply considerably mechanical restraints to the thermal expansion and contractions of the bushing, and as a result of these restraints premature failure of the platinum metal often occurs in the vicinity of the lugs. In a glass fibre plant up to 50% of bushing failures can be traced directly to fractures of this type near the lugs.

It is an object of the present invention to reduce the mechanical restraint on the current carrying lugs of bushing or like apparatus and hence increase the useful life of such components. A further object of the present invention is to provide a quick and simple technique for control of the thermal gradient present in the bushing and the bushing base plate.

According to the present invention there is provided an apparatus comprising a container suitable for holding molten glass at high temperature electrically connected to a source of electric current, the connection comprising a reservoir of electrically conducting material which is liquid at temperatures of operation and a current carrying conductor electrically connected to the said container and mounted for continuous electrical contact with the electrically conducting liquid during movement of said container.

The electrical connection of the invention is especially suitable for heavy duty applications. The electrically conducting liquid may be contained in a channel-shaped reservoir positioned for example, alongside a path defining the movement of the movable member. The path may be linear or any other shape, e.g., circular or arcuate.

The electrical connection of the invention may be used in instances where electric current is required at a number of diffrent stations in an assembly line.

According to one particular aspect of the present invention an electrical connection for the passage of electric current through equipment which is subject to thermal expansion and contraction comprises a reservoir made of metal in mechanically rigid contact with a current-supplying busbar, the said reservoir containing an oxidation-resistant electrically conducting material which is liquid at all temperatures of operation and dipping into said liquid metal a lug or extended lug forming part of or in electrical contact with the equipment. Preferably, the lug is made from a metal exhibiting a relatively low resistance to the passage of electric current. The electrically conducting material in the reservoir is metallic.

Electrical contact made via liquid metal permits the free relative expansion and contraction of the said equipment with the additional advantage that thermal gradient control is readily achieved by the variation of the liquid metal level.

In this specification the word "metal" includes "metallic alloy," whether liquid or solid.

The lug or extended lug forming part of the equipment is preferably made of a metal selected from the group consisting of ruthenium, rhodium, palladium, iridium, platinum, aluminum, copper, silver, gold, alloys of one or more of these metals with each other and alloys of one or more of these metals with other metals. The metal of the lug is preferably protected from attack at the liquid metal/air interface by a protective metallic or non-metallic barrier layer such as bonded zirconia cement.

Preferred liquid metals present in the reservoir exhibit a low vapor pressure and are molten under all conditions of operation. Other desirable characteristics are that the liquid metal will have a low ohmic resistance to the passage of electric current, and will be compatible with, i.e., will not attack unduly, the other constructional materials of the connector. A suitable metal in this application has been found to be a eutectic mixture of gallium, indium, and tin containing 62% Ga, 25% In and 13% Sn. This particular combination is liquid at normal ambient temperatures. This is a desirable attribute but it is not an essential feature of this invention, which only requires that the metal is in the liquid form under the operating conditions of the connector, that is, when current is passing and heat is being produced in the metal.

Other combinations of metals giving low melting point mixtures include fusible alloys containing such elements as bismuth, cadmium or lead in their constitution. A further desirable characteristic for the liquid metal is that it should be resistant to oxidation, the top surface normally being exposed to air. Combinations such as the well known NaK eutectic are therefore excluded from this application.

Figure 2:
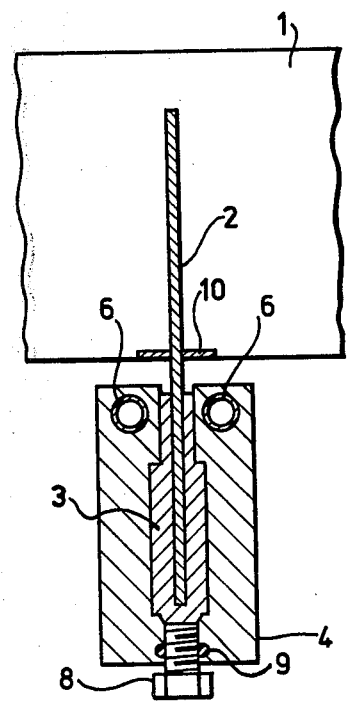

One embodiment of equipment in accordance with this invention is shown, by way of example, in the accompanying drawings, in which:

FIG. 1 is an isometric view of the equipment; and
FIG. 2 is a section taken on AA of FIG. 1.

Current is carried to a bushing body 1 via a platinum or platinum alloy lug 2. In this particular embodiment the lug 2 is extended somewhat in length compared with the normal design and dips into a liquid metal 3. The liquid metal 3 is housed in a rectangular copper housing or reservoir 4 which is bolted rigidly to a current supplying busbar 5. A coolant circuit in the form of water cooling pipes 6 is formed in the copper housing or reservoir 4 and serves to carry away the heat from the bushing conducted down the lug, from thermal radiation from the end of the bushing and also from ohmic losses in the connector itself. It will be apparent from FIG. 1 that the design alloys the lug to move without restraint in a vertical and/or a horizontal direction so that no damaging stresses are built up in the lug-to-bushing joint region 7.

If desired, the metal lug 2 may be formed with or have attached thereto a metal or alloy fin or collar 10. The purpose of the fin is to prevent liquid metal creeping up the surface of the lug by capillary of other action and attacking the same in the presence of air or the ambient atmosphere.

During the initial setting-up of the bushing by a glasswork's operator, considerable care should be taken that the temperature gradients near the ends of the bushing are kept to a minimum. In practice, this is normally achieved by vertical movement of water cooled copper clamps on the lugs, thereby varying the heat flow in these areas until suitable conditions are attained. Movement of the clamps involves loosening and tightening of the clamping bolts together with small movements of the clamps on the lugs, both of which operations may result in overstressing of the bushing. Thermal gradient control is possible much more simply with the present liquid connector, merely by varying the level of the surface of the liquid. A relatively straightforward method of carrying out this operation is illustrated in FIG. 2 and includes an adjustable screw 8, movement of which results in positive sensitive control of the liquid level. A sealing gland 9 in the screw adjuster serves to prevent escape of the liquid metal.

Other methods of liquid level control may equally well be applied to the connector such as a separate movable reservoir, or a movable diaphragm in one side of the connector, and the screw device shown in FIG. 2 is not intended to be exclusive.

In the embodiment given above, the platinum lug 2 is shown extended and dipping into the liquid metal 3. However, it is not essential that this extension should be of platinum. Economies will obviously result if some other highly conducting metal such as palladium, copper or silver is joined to the platinum lug in a position just below the air/liquid metal interface. If this is done, no change in thermal gradient down the lug will result when the normal clamping arrangement is replaced by the liquid connector. With some minor modifications it is equally acceptable to form the joint between the platinum lug and the extension piece in a region above the air/liquid metal interface.

Similarly, it is not essential that the housing for the liquid metal be of copper. Other good electrical conductors such as silver or aluminum could be used, although the latter would need to be lined with a more resistant metal to avoid attack by the liquid alloy. Alternatively, certain applications may be found or fusible combinations of metals chosen for which it is necessary to operate at slightly elevated temperatures. A housing of a more electrically resistive material such as stainless steel could then be used with advantage.

A rectangular geometry is shown in FIGS. 1 and 2 for the lug 2, the lug extension and liquid metal housing or reservoir 4. Other geometries may be found desirable because of space or current density considerations in the particular equipment, including round, annular, foliate, multistrand, etc., but all preferably consisting essentially of solid conductors dipping into or immersed in the liquid metal.

Very high thermal gradients exist down the lugs in the arrangement given in FIGS. 1 and 2, and situations may be found in which particularly severe conditions exist at the air/liquid metal interface leading to attack of the hot platinum in this region by the liquid metal. This may be ameliorated in practice by coating the platinum in this region with suitable resistant metallic or non-metallic layers. Examples of these are iridium or a bonded zirconia cement such as Thermocem (Registered Trade Mark).

The invention is further illustrated by the following examples

EXAMPLE 1

A water cooled copper conductor strip of cross-section 1.499 × 0.737 cms. was immersed to a depth of 1.27 cms. in the aforementioned gallium-indium-tin eutectic mixture held in a copper container. An alternating current of 1000 amps was passed through the liquid metal connector so formed for a total duration of 525 hours. This corresponds to a high current density of 905 amps/cm$^2$ in the copper conductor strip, and 176 amps/cm$^2$ at the strip/liquid metal junction. The temperature rise in the connector under these conditions was found to be negligible. No changes in voltage or current across the connector could be detected which would indicate deterioration of the connector, and after the termination of the test, neither could any significant attack by the liquid metal on the copper be observed.

EXAMPLE 2

To simulate the high thermal gradient down an operating bushing lug, a strip of platinum of 1.41 × 0.158 cms. cross-section was immersed in the liquid metal containted in a water cooled copper housing and operated at 320 amperes for 600 hours. Under these conditions the current density in the platinum was 1436 amps/cm$^2$ and resulted in the strip running at a bright red heat in a position about 4 cm. above the liquid metal surface. At the conclusion of the test, the platinum strip was examined and was found to have suffered very slight pitting attack at the liquid metal/air interface. However, the degree of attack was small and would not be unacceptable in bushing operation.

EXAMPLE 3

Reference has previously been made herein to coating the lug 2 in the region of the air/liquid metal interface with a suitable resistant material. In this connection a platinum lug of cross-section 1.69 × 0.1 cms. section was grit blasted and coated with zirconia cement over the said region. An alternating current of 600 amperes (corresponding to a current density of 3500 amps/cm$^2$) was passed for 24 days with negligible attack.

What we claim is:

1. Apparatus comprising a container suitable for holding molten glass at high temperature and an electrical connection for connecting the container to a source of electric current, the connection comprising a metal reservoir in mechanically rigid contact with a current supplying busbar, said reservoir containing electrically conducting material which is liquid at temperatures of operation and a current carrying conductor electrically connected to said container and dipping into the electrically conducting liquid to establish electrical contact therewith and mounted for continuous electrical contact with the electrically conducting liquid during movement of the said container relative to said reservoir caused in use by thermal expansion and contraction of the container and the contents thereof.

2. Apparatus according to claim 1, wherein the current carrying conductor is in the form of a lug attached to the container.

3. Apparatus according to claim 2, wherein the lug is rigidly attached to the container.

4. Apparatus according to claim 2, wherein the lug is made from a metal or alloy exhibiting a relatively low resistance to the passage of electric current.

5. Apparatus according to claim 4, wherein the lug is made from ruthenium, rhodium, palladium, iridium, platinum, aluminum, copper, silver, gold or alloys containing one or more of the aforesaid metals.

6. Apparatus according to claim 1, wherein that part of the lug in the region of the liquid metal/air interface carries a protective metallic or non-metallic barrier layer.

7. Apparatus according to claim 6, wherein the barrier layer is made from a zirconia cement or iridium.

8. Apparatus according to claim 6, wherein the lug includes a collar disposed in the region of the said interface to prevent liquid metal creeping up the surface of the lug.

9. Apparatus according to claim 1 including a coolant circuit for conducting coolant into and away from the reservoir.

10. Apparatus according to claim 1 including means for adjusting the level or liquid in the reservoir.

11. Apparatus according to claim 10, wherein said means is an adjustable screw.

12. Apparatus according to claim 1, wherein the container is fabricated from a metal selected from the group consisting of ruthenium, rhodium, palladium, iridium, platinum, aluminum, copper, silver, gold and alloys containing one or more of these metals.

13. Apparatus according to claim 1, wherein the container is a glass bushing.

14. Apparatus for processing molten glass comprising a container for holding molten glass and means for connecting said container to a source of electric current for heating said container, said means including a current supplying busbar, a metal reservoir in electrical and mechanical contact with said busbar, a mass of electrically conducting liquid material in said reservoir, a lug electrically connected to and carried by said container so as to move with said container during thermal expansion and contraction thereof, said lug dipping into said liquid material to establish continuous electrical contact therewith and being free of mechanical engagement with said reservoir to move without restraint in vertical and horizontal directions relative to said reservoir so that no damaging stresses are built up in said lug during thermal expansion or contraction of said container relative to said reservoir.

* * * * *